L. R. MILLER, Jr.
CARBURETER.
APPLICATION FILED JUNE 14, 1913.
1,095,510.
Patented May 5, 1914.
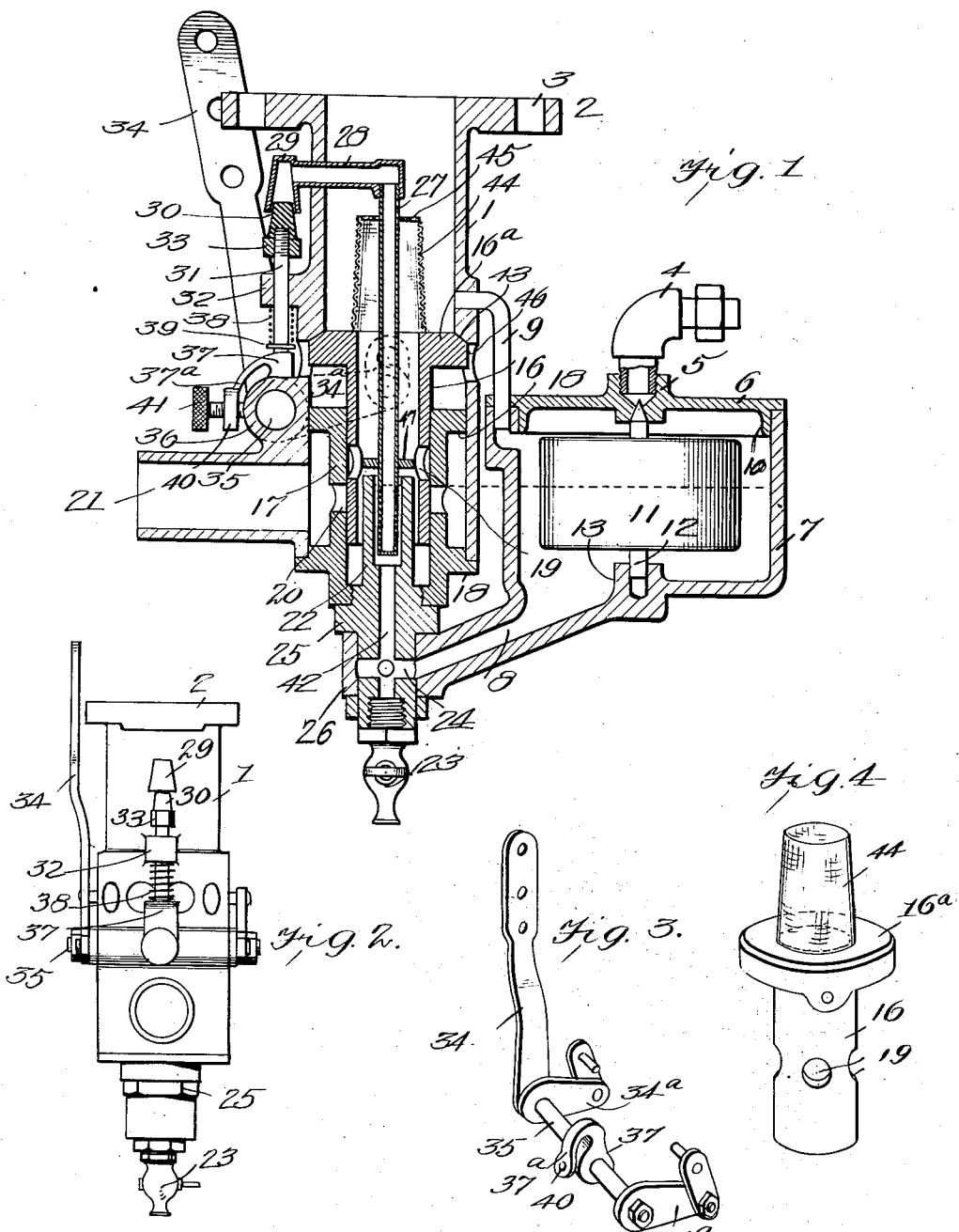
WITNESSES
F. C. Barry
C. E. Trawor
INVENTOR
Lewis R. Miller Jr.
BY Munn & Co.
ATTORNEYS

UNITED STATES PATENT OFFICE.

LEWIS R. MILLER, JR., OF DODGE CITY, KANSAS.

CARBURETER.

1,095,510.  Specification of Letters Patent.  Patented May 5, 1914.

Application filed June 14, 1913. Serial No. 773,659.

*To all whom it may concern:*

Be it known that I, LEWIS R. MILLER, Jr., a citizen of the United States, and a resident of Dodge City, in the county of Ford and State of Kansas, have invented a new and useful Improvement in Carbureters, of which the following is a specification.

My invention is an improvement in carbureters, and has for its object to provide a carbureter having a movable mixing tube so shaped and moved that it acts as a throttle, and is connected to the usual throttle operating mechanism, and operated in the same manner as the throttle is operated.

In the drawings:—Figure 1 is a longitudinal vertical section of the improved carbureter, Fig. 2 is a side view showing the throttle lever shaft and its connections, Fig. 3 is a perspective view of the throttle lever shaft and its connections detached, and Fig. 4 is a perspective view of the mixing tube and screen.

The present embodiment of the invention comprises a cylindrical casing 1, having a base flange 2, provided with the usual openings 3 for receiving holding bolts or the like, to secure the casing in place.

The gasolene supply pipe 4 is connected to a nipple 5, at the center on a cover plate 6, which fits within the open top of a valve casing 7, forming an extension from the casing 1 and connected thereto at the lower end by a pipe 8, and at the upper end by a tube 9. The cover plate 6, before mentioned, is provided with an annular lateral flange 10, which fits within the valve casing 7, and the tube 9 communicates with the said valve casing near the cover plate. The said tube 9 extends upwardly and opens into the casing 1, through the wall thereof above the level of the extension valve casing 7. A float 11 is arranged within the valve casing 7, the said float being connected to a needle valve stem 12, whose lower end is received in a recess in a boss 13 on the bottom of the casing 7, and the upper end of the stem is pointed or conical and coöperates with a conical seat at the inner end of the nipple 5, thus controlling the admission of the gasolene to the casing 7.

The casing 1 is provided with an annularly arranged series of air inlet openings 46, below the inlet end of the tube 9, and the mixing tube 16 is arranged in the casing 1, the upper end of the said tube having a lateral annular flange 16ª. A tubular body 17 is fitted within the casing 1, between the mixing tube and the inner wall of the said casing 1. The ends of the said tubular body are flanged laterally as indicated at 18, and the lower flange is rabbeted to fit against the lower end of the tube 1, for closing the same.

The body of the mixing tube 16 fits within the said tubular body and the said mixing tube is provided with an annular series of openings 19, which are adapted to coöperate with a similar series of openings 20 in the tubular body. The casing 1 is provided with a lateral inlet 21, at the level of the openings 20, the said inlet being the hot air inlet of the carbureter. A gasolene cup 22 is arranged within the lower end of the tubular body, the upper end of the said cup fitting within the lower end of the mixing tube 15, but being spaced apart from the wall thereof, as shown. The said cup is extended below the tubular body 17, and a drain valve 23 is connected with the said lower end. The pipe 8 before mentioned, opens into the bore of the gasolene cup, by means of radial passages 24, and the said cup is provided with an annular rib 25, arranged between the lower end of the tubular body 17 and the end of the pipe 8. The said pipe is provided with a sleeve 26, at its lower end, which is coaxial with the casing 1, and the rib 25 fits the space between the said sleeve and the tubular body.

A pipe 27 is arranged at the axis of the casing 1, the said pipe extending through the mixing tube and into the upper end of the gasolene cup, and at its lower end the pipe is closed but is provided with a series of perforations above the closed end as shown, for permitting the passage of the air from the pipe. The upper end of the pipe has a lateral extension 28, passing through the wall of the casing 1, and at its outer end the said extension is provided with a conical cap 29, arranged above a plug 30, secured to the upper end of a rod 31, which is mounted for vertical sliding movement in a bearing lug 32, extending laterally from the casing 1. Just below the plug a nut or washer 33 is threaded on to the rod 31, and the said nut or washer extends beyond the side wall of the plug 30, and is adapted to engage the under free end of the cap 29 to close the inlet to the pipe 27—28. The plug 30 is conical to fit the cap, and as the said plug is spaced below the cap, so will the amount of air entering the pipe 27—28 be regulated.

The throttle lever 34 is connected to a stub shaft 35, journaled in a bearing 36 on the casing 1, at the junction of the inlet 21 therewith, and a cam to be described, is connected with the said shaft, the said cam coöperating with the lower end of the rod 31. Radial arms 34ª rigid with the shaft are connected with the mixing tube 16, in such manner that when the shaft 34 is moved toward the right of the drawing, the mixing tube will be lowered in the casing 1, and when the said lever is moved in the opposite direction, the mixing tube will be lifted. It will be noticed that the casing 1 is provided with an internal annular beveled shoulder 43, against which the annular flange 16ª at the upper end of the mixing tube abuts when the said tube is in its highest position. The shoulder thus limits the upward movement of the tube. The rod 31 is normally pressed downward by a coil spring 38, arranged between the bearing lug 32 and an annular rib or collar 39 on the said rod. The cam before mentioned, comprises a radial lug or body portion 37 rigid with the shaft 35, and a resilient extension 37ª extending substantially circumferential to the shaft 35 in spaced relation and having at the free end thereof an internal threaded nut 40. A set screw 41 is journaled for rotation at its inner end in the shaft 35, and the said nut 40 is threaded on to the set screw. By turning the set screw in the proper direction, the eccentricity of the cam, consisting of the extension and the lug, may be varied. The amount of eccentricity of the cam is constant at the lug 37, but by moving the nut 40 toward or from the shaft 35, the extent of opening of the air inlet for the high speed adjustment may be varied to cause the said inlet to open more or less widely.

The gasolene is fed to the extension casing 7 by means of the pipe 4, and normally stands at the level indicated by the dotted lines in the said casing. When the gasolene falls below this level, the float 11 moves downwardly, thus lowering the needle valve to permit more fuel to enter through the boss 5. The gasolene flows down through the pipe 8 into the bore 42 of the gasolene cup, by means of the radial passages 24, and passes upwardly into the enlarged or counterbored upper end of the bore to the level indicated by the before mentioned dotted lines. It will be noticed that the said line is just below the upper edge of the gasolene cup, and just above the uppermost perforations in the air inlet tube 27. Thus the air entering through the inlet end of the said tube is discharged below the level of the gasolene in the gasolene cup, and the said air bubbles up through the gasolene, causing a film of the same to be discharged over the outside of the said cup.

The mixing tube 16 may be lowered by means of the throttle lever, to cause the series 19 of openings in the mixing tube to register with the series 20 of the tubular structure 17, in which the mixing tube moves, whereby to admit more or less heated air through the inlet 21 to the interior of the mixing tube. This heated air passes upwardly in intimate contact with the film of gasolene, before mentioned, thus carrying a considerable portion of gasified fuel into the mixing tube. The gasified fuel mixed with the heated air passes upwardly through the mixing tube into the upper part of the casing 1, and through a screen tube 44, open at its lower end, and closed at its top, as indicated at 45. Any gasolene that may collect on the inner wall of the mixing tube finds its way to the screen tube 44 and is vaporized by the air admitted through the opening 46 above the flange 16ª of the mixing tube.

The plug 30 is spaced apart from the conical cap 29 a sufficient distance to permit some air to enter the air inlet tube. The farther forward the throttle lever is moved, the more widely is the air inlet opened. With the throttle lever in normal position, that is, in the position it occupies when the engine is not running, the extent of opening of the auxiliary air inlet may be adjusted to suit conditions by turning the plug and the washer 33 on the stem to move them toward or from the cap 29. The amount of air admitted on the high speed may be adjusted by means of the set screw 41. It will be evident from the description that the vaporizing nozzle is arranged between the throttle and the engine, that is, the throttle is arranged to control the admission of air both heated and atmospheric to the mixing tube instead of arranging the said throttle between the mixing tube and the engine. The latter arrangement is necessarily faulty, since it merely controls the amount of mixture admitted to the engine without controlling, vaporizing and regulating the constitution of the said mixture as does the present arrangement.

In operation, the gasolene stands at the level of the dotted line in the gasolene cup, the float 11 being arranged to hold the level at this point. When the throttle lever 34 is moved forwardly, to lower the mixing tube 16, to cause the openings 19 of the said tube to partly register with the openings 20, heated air is admitted to the mixing tube, the amount depending upon the extent of movement of the throttle lever.

As before stated, the atmospheric air enters the gasolene in the cup below the level of the same, thus causing the gasolene to foam and to flow out over the upper end of the tube in a thin film filled with air bubbles. The heated air easily vaporizes this gasolene and the mixture is drawn by the suction of the engine through the screen 44 and into the engine.

When the throttle lever is opened wider, the openings 19 register with the openings 20 to a greater extent, while at the same time the extent of opening of the auxiliary air inlet, that is, the amount of auxiliary air admitted, depends upon the arrangement of the cam 37ª. This cam may be arranged to admit a greater quantity of auxiliary or atmospheric air as the speed increases.

The suction of the engine has no effect upon the gasolene level in the gasolene cup, since it does not draw through the gasolene cup but around the same. Neither is there any tendency of the gasolene to flow downwardly into the mixing tube on account of the partial vacuum obtaining in the carbureter through the suction of the engine, the tube 9 counteracting this tendency. It will be evident that the air will be rarefied as greatly above the gasolene in the extension casing 7 as it will above the gasolene in the gasolene cup. In addition the air is admitted through the annular series of openings 46 just below the shoulder 43, so that when the mixing tube is lowered, these openings are also opened. The greater the extent of opening of the mixing tube the greater the air that may flow in through the opening 46. Thus, the amount of mixture as well as the constitution of the said mixture is regulated by the throttle. When it is desired to admit a larger amount of gas to the engine, the throttle lever 34 is moved to the right of the drawing, thus moving the mixing tube to its lowest extent and opening the openings 46 completely as well as causing the openings 19 to register with the openings 20.

The auxiliary air inlet at the cap 29 will also be opened to its greatest extent. Thus the air will rush through the pipe 27, causing violent bubbling of the gasolene in the gasolene cup, while at the same time, the heated air will rush in through the openings 19 and 20, catching up and vaporizing the gasolene, which is drawn through the mixing tube and mixed with the atmospheric air through the openings 46. Such portions of the gasolene as are not vaporized are caught by the screen 44, and vaporized by the air admitted through openings 46. The said screen is a retainer for the gasolene in liquid form. The tubular body 17 is a guide sleeve for the mixing tube, arranged between the said tube and the casing 1.

The hot air inlet openings 20 of the guide sleeve are at the axis of the inlet tube for the hot air. The gasolene cup being close to the throttle openings 19 and 20, the gasolene is subjected to the most violent action of the said air as it rushes into the mixing tube. On this account a much better vaporization of the fuel is attained. The auxiliary air inlet through the tube 27—28 assists in vaporizing the gasolene as it drives it out over the upper end of the gasolene cup. It will be noticed that there is sufficient space for the downward movement of the mixing tube between the guide sleeve and the gasolene cup. The first downward movement of the mixing tube permits some air to enter through the openings 46 of the casing 1 and the farther down the mixing tube is moved, the greater the amount of air admitted through the said openings. The lower end of the tube 27 is held in proper relation with respect to the mixing tube 16, by means of a spider 47. The top 45 of the tube 44 is also of perforate material, so that all of the fuel passing into the casing 1 is thoroughly strained by the said tube.

I claim:—

1. A carbureter comprising a casing of cylindrical form having its lower end internally enlarged or counterbored to form an annular shoulder between the said enlargement and the body of the casing, said casing having an annular series of air inlet openings in the counterbored portion at the shoulder and having a hot air inlet opening in the counter-bored portion beyond the said openings, a guiding sleeve in the counterbored portion at the air inlet opening, said sleeve having at each end an annular rib engaging the inner surface of the counter-bored portion, said ribs being on opposite sides of the hot air inlet, said sleeve having an annular series of openings at the said inlet, a gasolene cup in the lower end of the guide tube and extending above the series of openings, a mixing tube movable in the guide sleeve and having an annular series of openings for registering with the openings of the sleeve, said mixing tube having an annular marginal rib at its upper end for contacting with the shoulder of the casing when the openings of the tubes are out of register with the openings of the sleeve, an air inlet tube extending through the mixing tube into the gasolene cup, means in connection with the carbureter for retaining the gasolene at a predetermined level in the gasolene cup, said air inlet tube having perforations below the level of the gasolene, a throttle lever connected with the mixing tube for moving the same, the air inlet tube having an extension outside the casing provided with a conical seat at its inlet end, a conical valve coöperating with the seat, a cam for operating the said valve, a rigid connection between the throttle lever and the cam, and means for varying the eccentricity of the cam.

2. A carbureter comprising a casing of cylindrical form having its lower end internally enlarged or counterbored to form an annular shoulder between the said enlargement and the body of the casing, said casing having an annular series of air inlet openings in the counterbored portion at the shoulder and having a hot air inlet opening in the counterbored portion beyond the said openings, a guiding sleeve in the counterbored portion at the air inlet opening, said sleeve having at each end an annular rib engaging the inner surface of the counterbored portion, said ribs being on opposite sides of the hot air inlet, said sleeve having an annular series of openings at the said inlet, a gasolene cup in the lower end of the guide tube and extending above the series of openings, a mixing tube movable in the guide sleeve and having an annular series of openings for registering with the openings of the sleeve, said mixing tube having an annular marginal rib at its upper end for contacting with the shoulder of the casing when the openings of the tube are out of register with the openings of the sleeve, an air inlet tube extending through the mixing tube into the gasolene cup, means in connection with the carbureter for retaining the gasolene at a predetermined level in the gasolene cup, said air inlet tube having perforations below the level of the gasolene, a throttle lever connected with the mixing tube for moving the same, the air inlet tube having an extension outside the casing provided with a conical seat at its inlet end, a conical valve coöperating with the seat, a cam for operating the said valve, and a rigid connection between the throttle lever and the cam.

3. A carbureter comprising a casing having an annular internal shoulder intermediate its ends and having an annular series of openings below the said shoulder, a mixing tube in the casing having an annular rib fitting against the shoulder, a guide sleeve for the tube in the casing, said sleeve having annular ribs at each end contacting with the inner surface of the casing and closing the space between the casing and the sleeve at each end of the sleeve, said casing having a hot air inlet intermediate the ends of the sleeve and the sleeve and the mixing tube having annular series of openings out of register when the mixing tube is in engagement with the shoulder, a gasolene cup in the lower end of the guide sleeve, means for retaining gasolene at a predetermined level in the cup, said level being just below the upper end of the cup, an auxiliary air tube passing through the mixing tube and extending below the level of the gasolene therein, said tube being perforated below the said level, said tube extending outside the casing, a valve for closing the inlet end of the said tube, a stem to which the valve is connected, a spring normally holding the said valve open, a throttle lever connected with the mixing tube for moving the same longitudinally, a cam rigid with the shaft and engaging the valve stem for opening the valve when the throttle is open, and means for varying the eccentricity of the cam for the purpose specified.

4. A carbureter comprising a casing having an annular internal shoulder intermediate its ends and having an annular series of openings below the said shoulder, a mixing tube in the casing having an annular rib fitting against the shoulder, a guide sleeve for the tube in the casing, said sleeve having annular ribs at each end contacting with the inner surface of the casing and closing the space between the casing and the sleeve at each end of the sleeve, said casing having a hot air inlet intermediate the ends of the sleeve and the sleeve and the mixing tube having annular series of openings out of register when the mixing tube is in engagement with the shoulder, a gasolene cup in the lower end of the guide sleeve, means for retaining gasolene at a predetermined level in the cup, said level being just below the upper end of the cup, an auxiliary air tube passing through the mixing tube and extending below the level of the gasolene therein, said tube being perforated below the said level, said tube extending outside of the casing, a valve coöperating with the inlet end of the tube for varying the amount of air admitted thereto, and a common means for moving the mixing tube longitudinally of the casing and for operating the said valve.

5. A carbureter comprising a casing, a mixing tube in the casing, a guide sleeve for the tube in the casing, said sleeve engaging the casing at each of its ends, the casing having a hot air inlet intermediate the ends of the sleeve and the sleeve having air openings arranged in annular form at the said inlet, a mixing tube movable longitudinally of the sleeve and having air inlet openings adapted to register with those of the sleeve, said casing having an annular series of air inlet openings below the upper end of the tube when the said tube is in its uppermost position, said tube closing the upper end of the casing from the said inlet openings when in uppermost position, a gasolene cup in the lower end of the guide sleeve, means in connection with the casing for holding the gasolene at a predetermined level in the cup, said cup extending above the inlet openings of the sleeve, an auxiliary air tube opening below the level of the gasolene in the cup and having perforations below the said level, and a common means for moving the mixing tube longitudinally and for regulating the amount of air admitted through the auxiliary air tube.

6. A carbureter comprising a casing having a lateral hot air inlet, a gasolene cup in the casing, means for supplying gasolene to the said cup and for retaining the gasolene at a predetermined level in the cup, a mixing tube movable longitudinally of the casing, a guide sleeve between the tube and the casing and having an inlet opening at the hot air inlet, said mixing tube having an opening for registering therewith when the tube is in its lowermost position, means for supplying atmospheric air to the gasolene cup below the level of the gasolene for forcing the gasolene over the edge of the cup, the hot air inlet being at the upper end of the said cup, means for controlling the air admitted to the gasolene cup, and a common means for controlling the movement of the mixing tube and the said regulating means, the casing having supplementary air inlet openings uncovered by the mixing tube when it moves downward.

7. A carbureter comprising a casing having a lateral hot air inlet, a gasolene cup in the casing, means for supplying gasolene to the said cup and for retaining the gasolene at a predetermined level in the cup, a mixing tube movable longitudinally of the casing, a guide sleeve between the tube and the casing and having an inlet opening at the hot air inlet, said mixing tube having an opening for registering therewith when the tube is in its lowermost position, means for supplying atmospheric air to the gasolene cup below the level of the gasolene for forcing the gasolene over the edge of the cup, the hot air inlet being at the upper end of the said cup, means for controlling the air admitted to the gasolene cup, and a common means for controlling the movement of the mixing tube and the said regulating means.

8. A carbureter comprising a casing having a lateral hot air inlet, a gasolene cup in the casing, means for supplying gasolene to the said cup and for retaining the gasolene at a predetermined level in the cup, a mixing tube movable longitudinally of the casing, a guide sleeve between the tube and the casing and having an inlet opening at the hot air inlet, said mixing tube having an opening for registering therewith when the tube is in its lowermost position, means for supplying atmospheric air to the gasolene cup below the level of the gasolene for forcing the gasolene over the edge of the cup, and a common means for controlling the movement of the mixing tube and the air supplying means to the gasolene cup.

9. A carbureter comprising a mixing tube having air inlet openings intermediate its ends, a guide sleeve having air inlet openings intermediate its ends, the mixing tube being movable in the guide sleeve to cause the openings thereof to register with the openings of the guide sleeve, a gasolene cup supported within the guide tube at its lower end, the upper end of the cup being above the level of the inlet openings of the said guide sleeve, means for retaining gasolene at a predetermined level in the cup and just below the top thereof, means for admitting air to the said cup below the level of the gasolene, a casing in which the guide sleeve is fixed, said casing having an inlet for hot air at the openings of the guide tube and having lateral inlets for air normally closed by the mixing tube when the openings thereof are out of register with the openings of the guide sleeve, said casing communicating with the engine at the end remote from the gasolene cup, a retainer of perforate material between the guide sleeve and the engine, and a common means for moving the mixing tube in the guide sleeve and for controlling the admission of air to the gasolene in the cup.

10. A carbureter comprising a mixing tube having air inlet openings intermediate its ends, a guide sleeve having air inlet openings intermediate its ends, the mixing tube being movable in the guide sleeve to cause the openings thereof to register with the opening of the guide sleeve, a gasolene cup supported within the guide tube at its lower end, the upper end of the cup being above the level of the inlet opening of the said guide sleeve, means for retaining gasolene at a predetermined level in the cup and just below the top thereof, means for admitting air to the said cup below the level of the gasolene, means for conducting the mixture from the upper end of the tube to the engine, and a common means for moving the mixing tube and for controlling the supply of air to the gasolene in the cup.

11. A carbureter comprising a casing adapted to be connected with the engine at one end and having a lateral inlet for hot air near the other end, a mixing tube movable in the casing and closing the same at its upper end, said tube having a lateral inlet opening for registering with the lateral inlet of the casing, a gasolene cup within the lower end of the mixing tube, means for retaining gasolene at a predetermined level in the cup, means for supplying air below the level of the gasolene, the casing having air inlets closed by the mixing tube when the inlet opening thereof is out of register with the inlet opening of the casing, and a common means for moving the mixing tube and for controlling the supply of air admitted to the gasolene cup.

12. A carbureter comprising a casing adapted to be connected with the engine at one end and having a lateral inlet for hot air near the other end, a mixing tube movable in the casing and closing the same at its upper end, said tube having a lateral inlet opening for registering with the lateral inlet of the casing, a gasolene cup within the lower end of the mixing tube, means for retaining gasolene at a predetermined level in the cup, means for supplying air below the level of the gasolene, and a common means for moving the mixing tube and controlling the amount of air admitted to the gasolene cup, and a retainer of perforate material in the casing between the upper end of the mixing tube and the first-named end of the casing.

13. A carbureter comprising a casing adapted to be connected with the engine at one end and having a lateral inlet for hot air near the other end, a mixing tube movable in the casing and closing the same at its upper end, said tube having a lateral inlet opening for registering with the lateral inlet of the casing, a gasolene cup within the lower end of the mixing tube, means for retaining gasolene at a predetermined level in the cup, means for supplying air below the level of the gasolene, and a common means for moving the mixing tube and controlling the amount of air admitted to the gasolene cup.

14. In a carbureter, a container for gasolene, means for retaining a predetermined amount of gasolene in the container, means for supplying air to the container below the level of the gasolene for driving the gasolene over the upper edge of the container, a mixing tube encircling the container and movable longitudinally thereof, a casing inclosing the tube and the container, and having a lateral inlet for hot air, the mixing tube having an inlet for registering with the inlet of the casing, and a common means for moving the tube and for controlling the air supplied to the container.

15. In a carbureter, a guide sleeve having a gasolene receptacle, a mixing tube movable in the guide sleeve, said tube and sleeve having lateral inlets adapted to register with each other, means for retaining the gasolene at a predetermined level in the receptacle, means for supplying air to the receptacle below the level of the gasolene, a valve for controlling the supplying means, a cam for closing the valve, and a common means for moving the mixing tube to bring the inlets in register with each other and for operating the cam, and means in connection with the cam for varying the eccentricity thereof for varying the relative speed of movement of the tube and valve.

16. In a carbureter, a guide sleeve having a gasolene receptacle, a mixing tube movable in the guide sleeve, said tube and sleeve having lateral inlets adapted to register with each other, means for retaining the gasolene at a predetermined level in the receptacle, means for supplying air to the receptacle below the level of the gasolene, means for simultaneously moving the tube to bring the inlets of the tube and sleeve into register and for regulating the amount of air admitted to the cup, and means in connection with the said means for varying the relative speed of movement of the tube with respect to the amount of air admitted.

17. In a carbureter, a guide sleeve having a gasolene receptacle, a mixing tube movable in the guide sleeve, said tube and sleeve having lateral inlets adapted to register with each other, means for retaining the gasolene at a predetermined level in the receptacle, means for supplying air to the receptacle below the level of the gasolene, and means for simultaneously moving the tube to bring the inlets of the tube and sleeve into register and for regulating the amount of air admitted to the receptacle.

18. In a carbureter, a guide sleeve having a gasolene receptacle, a mixing tube movable in the guide sleeve, said tube and sleeve having lateral inlets adapted to register with each other, means for retaining the gasolene at a predetermined level in the receptacle, a casing for connection with the engine inclosing the guide sleeve and having a hot air inlet at the inlet openings of the sleeve, means for supplying air below the level of the gasolene, and a common means for controlling the movement of the tube and the said supplying means.

19. In a carbureter, a guide sleeve having a gasolene receptacle, a mixing tube movable in the guide sleeve, said tube and sleeve having lateral inlets adapted to register with each other, means for supplying air to the gasolene below the level thereof, and a common means for moving the tube and for regulating the said air supplying means.

LEWIS R. MILLER, Jr.

Witnesses:
KARL MILLER,
CLARA McMILLAN.